(12) United States Patent
Kalker et al.

(10) Patent No.: US 8,452,971 B2
(45) Date of Patent: May 28, 2013

(54) EMBEDDING AND DETECTION OF WATERMARK IN A MOTION IMAGE SIGNAL

(75) Inventors: Antonius Adrianus Cornelis Maria Kalker, Eindhoven (NL); Jaap Andre Haitsma, Eindhoven (NL)

(73) Assignee: Civolution B.V., Eindhoven (NL)

( * ) Notice: Subject to any disclaimer, the term of this patent is extended or adjusted under 35 U.S.C. 154(b) by 0 days.

(21) Appl. No.: 13/188,813

(22) Filed: Jul. 22, 2011

(65) Prior Publication Data

US 2011/0280436 A1 Nov. 17, 2011

Related U.S. Application Data

(63) Continuation of application No. 10/480,339, filed as application No. PCT/IB02/02335 on Jun. 18, 2002, now Pat. No. 7,996,678.

(30) Foreign Application Priority Data

Jun. 21, 2001 (EP) ..................................... 01202460

(51) Int. Cl.
*H04L 9/32* (2006.01)

(52) U.S. Cl.
USPC ......................................................... 713/176

(58) Field of Classification Search
None
See application file for complete search history.

(56) References Cited

U.S. PATENT DOCUMENTS

| | | | |
|---|---|---|---|
| 5,363,212 A | 11/1994 | Taniuchi et al. | |
| 5,530,759 A | 6/1996 | Braudaway et al. | |
| 6,037,984 A * | 3/2000 | Isnardi et al. | 375/240.21 |
| 6,049,627 A * | 4/2000 | Becker et al. | 382/181 |
| 6,222,932 B1 * | 4/2001 | Rao et al. | 382/100 |
| 6,535,617 B1 | 3/2003 | Hannigan et al. | |
| 6,590,996 B1 | 7/2003 | Reed et al. | |
| 6,630,953 B1 | 10/2003 | Toyoda et al. | |

(Continued)

FOREIGN PATENT DOCUMENTS

| | | |
|---|---|---|
| EP | 0 913 818 | 5/1999 |
| EP | 0 915 462 | 5/1999 |

(Continued)

OTHER PUBLICATIONS

Kalker et al., "A Video Watermarking System for Broadcast Monitoring", SPIE, vol. 3657 pp. 103-112 (1999).

(Continued)

*Primary Examiner* — Kambiz Zand
*Assistant Examiner* — Leynna Truvan
(74) *Attorney, Agent, or Firm* — Barnes & Thornburg LLP

(57) ABSTRACT

A video watermarking scheme is disclosed, which is designed for the digital cinema format, as it will be used on large projector screens in theaters. The watermark is designed in such a way that it has minimal impact on the video quality, but is still detectable after capture with a handheld camera and conversion to, for instance, VHS, CD-Video or DVD format. The proposed watermarking system only exploits the temporal axis. This makes it invulnerable to geometrical distortions generally caused by such a way of capturing. The watermark is embedded by modulating a global property of the frames (e.g. the mean luminance) in accordance with the samples of the watermark. The embedding depth is preferably locally adapted within each frame to local statistics of the respective image. Watermark detection is performed by correlating the watermark sequence with extracted mean luminance values of a sequence of frames.

2 Claims, 1 Drawing Sheet

U.S. PATENT DOCUMENTS

| | | | |
|---|---|---|---|
| 6,700,991 B1 | 3/2004 | Wu et al. | |
| 6,701,019 B1 | 3/2004 | Wu et al. | |
| 6,718,045 B2 | 4/2004 | Donescu et al. | |
| 6,792,129 B1 * | 9/2004 | Zeng et al. | 382/100 |
| 6,959,098 B1 | 10/2005 | Alattar | |
| 6,970,575 B2 | 11/2005 | Echizen et al. | |
| 6,993,535 B2 | 1/2006 | Bolle et al. | |
| 7,031,491 B1 | 4/2006 | Donescu et al. | |
| 7,035,700 B2 | 4/2006 | Gopalan et al. | |
| 7,039,224 B2 | 5/2006 | Hamid et al. | |
| 7,058,979 B1 | 6/2006 | Baudry et al. | |
| 7,082,537 B2 | 7/2006 | Muratani | |
| 7,127,065 B1 * | 10/2006 | Depovere et al. | 380/201 |
| 7,130,443 B1 | 10/2006 | Werner et al. | |

FOREIGN PATENT DOCUMENTS

| | | |
|---|---|---|
| JP | 2000-260079 | 9/2000 |
| WO | 99/45705 | 9/1999 |
| WO | 99/45706 | 9/1999 |

OTHER PUBLICATIONS

Haitsma et al., "A Watermarking Scheme For digital Cinema", IEEE, pp. 487-489, (2001).

Cox et al., "Secure Spread Spectrum Watermarking For Multimedia", Prospekt Mettler Instruments, pp. 1-33, (1995).

* cited by examiner

EMBEDDING AND DETECTION OF WATERMARK IN A MOTION IMAGE SIGNAL

This is a Continuation Application of U.S. patent application Ser. No. 10/480,339, filed on Dec. 11, 2003, which claims priority to European Patent Application No. 01202460.0 filed Jun. 21, 2001 and to International Patent Application No. PCT/IB2002/02335 filed Jun. 18, 2002, the contents of which Applications are incorporated herein by reference in their entirety.

FIELD OF THE INVENTION

The invention relates to a method and apparatus for embedding a watermark in a motion image signal. The invention also relates to a method and apparatus for detecting said watermark.

BACKGROUND OF THE INVENTION

A prior-art method of embedding a watermark in a motion image signal is disclosed in International Patent Application WO-A-99/45705. In this prior-art method, a two-dimensional sequence of watermark samples is completely, and even a plurality of times, embedded in an image of a video signal.

Watermark embedding is an important aspect of copy protection strategies. Although most copy protection schemes deal with protection of electronically distributed contents (broadcasts, storage media), copy protection is also desired for movies being shown in theaters. Illegal copying in the cinema by means of a handheld video camera is already common practice. The quality is usually very low, but the economical impact of illegal VHS tapes, CD-Videos and DVDs can be enormous.

In the coming years, the digital cinema format, 1920×1080×24×36 (pixels/line ×lines/frame×frames/s×bits/pixel), will be introduced in the theaters. By introducing this very high-quality digital format, the threat of illegal copying by handheld video cameras will be even larger. For this reason, cinema owners are obliged to prevent the presence of video cameras on their premises. Not abiding by this rule may be sanctioned with a ban on the future availability of content. In view thereof, it is envisioned to add a watermark during show time. The watermark is to identify the cinema, the presentation time, operator, etc.

Most watermark schemes, including the one mentioned in the opening paragraph, are sensitive to alignment errors at detection time. Solutions have been published to either insert the watermark in a domain that is invariant for a certain class of geometrical transforms, or to find back the alignment during detection. A disadvantage of these methods is that they can generally only cope with a limited number of geometrical transformations. Furthermore, these methods usually decrease the robustness to other attacks.

The requirements for the digital cinema watermark, similarly as for any other watermarking scheme, are: (i) robustness, (ii) imperceptibility and (iii) a low false positive rate. Achieving sufficient robustness is the most challenging requirement. The handheld camera will not only seriously degrade the video by filtering (the optical path from the screen to the camera, transfer to tape etc.) but also seriously geometrically distort the video (shifting, scaling, rotation, shearing, changes in perspective, etc.). In addition, these geometrical distortions can change from frame to frame.

OBJECT AND SUMMARY OF THE INVENTION

It is an object of the invention to provide a method of embedding a watermark in a motion image signal which fulfills the above-mentioned requirements, particularly with respect to robustness against geometrical distortions.

To this end, the method according to the invention comprises the steps of determining, for each image, a global property of the pixels constituting said image, and modifying the global property of each image of a sequence of images in accordance with the corresponding watermark sample. In a preferred embodiment, said global property is the mean luminance of an image.

It is achieved with the invention that the sequence of watermark samples constituting the watermark is distributed in a corresponding sequence of images, one watermark sample being embedded per image. The method thus embeds the watermark along the temporal axis and is therefore inherently robust against all geometrical distortions.

Since the Human Visual System is sensitive to flicker in low spatial frequencies, the watermarked signal may suffer from artifacts especially in non-moving flat areas. These artifacts can be significantly reduced, when the flicker frequency of the watermark is lowered, by embedding the same watermark sample in a fixed number of consecutive frames. Furthermore, it is proposed to use an adaptive scheme, where the change in luminance for a pixel depends on a local scaling factor, which is determined for every pixel. The local scaling factor should be large in moving textured areas and low in non-moving flat areas.

The embedded watermark is detected by determining the global properties at the detection end, correlating a sequence of global properties with a sequence of reference watermark samples, and generating an output signal if the correlation value exceeds a predetermined threshold value.

DESCRIPTION OF EMBODIMENTS

Figure 1:
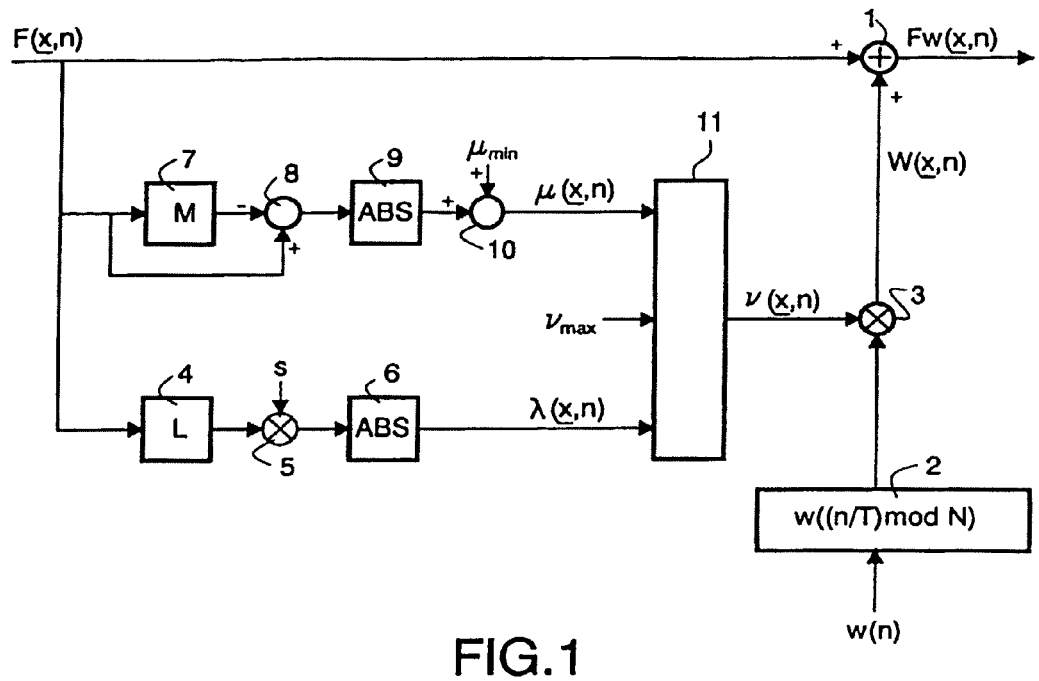
FIG. 1 shows a schematic diagram of a watermark embedder according to the invention.

FIG. 1 shows a schematic diagram of a watermark embedder according to with the invention. The embedder receives a cinema movie in the form of a HDTV video signal having a luminance $F(x,n)$ at spatial position x of frame n. The embedder further receives a watermark in the form of a pseudo-random sequence $w(n)$ of length N, where $w(n)\in[-1, 1]$. An appropriate value of N for this application is N=1024.

In the simplest embodiment of the watermark embedder, the sequence $w(n)$ is directly applied to an embedding stage 1 which embeds one watermark sample in every frame. In the preferred embodiment, this is performed by increasing the luminance of every pixel of frame n by 1 if the watermark sample $w(n)=+1$, and decreasing by 1 if $w(n)=-1$. The mean luminance of the sequence of frames is thus modulated by the watermark. The watermark repeats itself every N frames.

Other examples of frame parameters that can be modulated by the watermark are picture histograms (a list of relative frequencies of luminance values in the picture), or features derived therefrom such as high order moments (average of luminance values to a power k). The average luminance is a specific example of the latter (k=1).

Since the Human Visual System (HVS) is sensitive to flicker in low spatial frequencies, this simple embodiment may suffer from artifacts especially in non-moving flat areas. These artifacts are significantly reduced by lowering the flicker frequency of the watermark. This is performed by a repetition stage 2 which repeats each watermark sample during a predetermined number T of consecutive images. The same watermark sample is thus embedded in a number of consecutive frames.

The preferred embodiment of the embedder which is shown in FIG. 1 further adapts the embedding depth in dependence upon the image contents. To this end, the embedder comprises a multiplier 3 which multiplies each watermark sample with a local scaling factor v(x,n). The local scaling factor is large in moving textured areas and low in non-moving flat areas. To achieve this, the local scaling factor v(x,n) is the minimum of a spatial-scaling factor λ(x,n) and a motion-scaling factor μ(x,n). Moreover, the result is clipped if it exceeds a maximum allowable luminance change $v_{max}$. This operation is performed by a selector 11.

The spatial adaptation is realized by a spatial adaptation stage, which comprises a Laplacian filter 4, a multiplier 5, and absolute value calculating means 6. The spatial adaptation stage receives the luminance values F(x,n) and generates the local-scaling factor λ(x,n) using the absolute value of the response of the Laplacian filter and multiplication with a global factor s in accordance with:

$$\lambda(x, n) = s \cdot \left| F(x, n) * \begin{bmatrix} -1 & -1 & -1 \\ -1 & 8 & -1 \\ -1 & -1 & -1 \end{bmatrix} \right|$$

The global scaling factor is a trade-off between visibility and robustness.

The motion-scaling factor μ(x,n) is generated by a motion detector comprising a frame memory 7, a subtractor 8, and absolute value calculating means 9. The detector calculates the motion-scaling factor p for every pixel by determining the absolute difference with the previous frame. In order to be able to embed a watermark in a non-moving sequence, a small offset $\mu_{min}$ is added by an adder 10 to the absolute frame difference.

The watermarked frame $F_w(x,n)$ is obtained by adding the resulting watermark W(x,n) to the original frame F(x,n). It is this watermarked signal $F_w(x,n)$ which is projected on the cinema screen.

Figure 2:
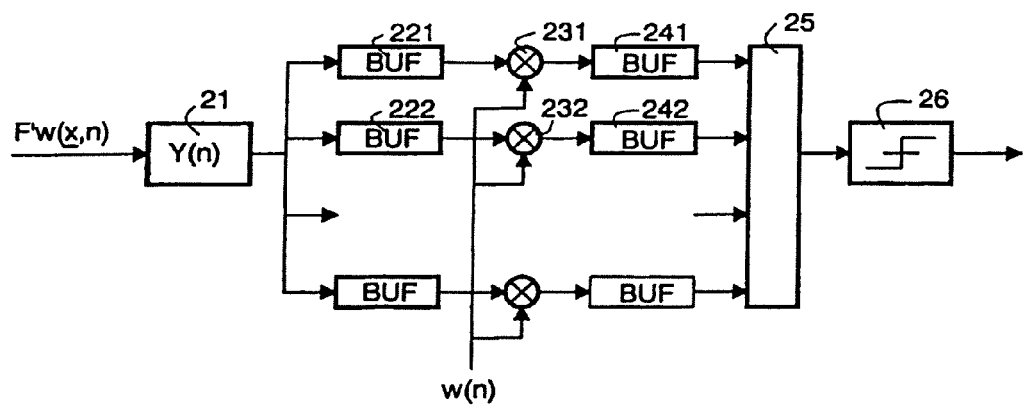
FIG. 2 shows a schematic diagram of a watermark detector according to the invention.

FIG. 2 shows a schematic diagram of a watermark detector according to the invention. Although the original signal is available during detection, the detector does not utilize any knowledge about the original. The detector receives a recorded version $F'_w(x,n)$ of the watermarked signal $F_w(x,n)$. The arrangement comprises luminance extraction means 21, which calculates the mean luminance Y(n) of every image n. The extracted luminance values Y(n) of N·T images are distributed to T buffers 221, 222, . . . , where, as described above, T is the number of consecutive images in which the same watermark sample is embedded. Each buffer stores N mean luminance values. Typical values of the watermark length N and the frames per watermark sample T are 1024 and 5, respectively. Accordingly, the first buffer 221 contains mean luminance values Y(1), Y(6), Y(11), . . . , the second buffer 222 contains mean luminance values Y(2), Y(7), Y(12), . . . , etc. This implies that the granularity of watermark detection is approximately 3 minutes and 25 seconds for PAL video. In order to boost the detection, the buffer contents may be filtered with a FIR filter [−1 2 −1] and subsequently clipped between −10 and +10 to equalize the data in the buffers. Said filtering and equalizing step is not shown in the Figure.

The watermark is detected by determining the similarity of each buffer content with one or possibly more reference watermarks w(n). Each watermark can, for instance, identify one theater. A well-known example of similarity is cross-correlation, but other measures are possible. The contents of each buffer are cross-correlated with the reference watermark in respective correlators 231, 232, . . . . The correlation is preferably performed using Symmetrical Phase Only Matched Filtering (SPOMF). For a description of SPOMF, reference is made to International Patent application WO 99/45/45706. In said document, the correlation is performed in the two-dimensional spatial domain. Blocks of N×N image pixels are correlated with an N×N reference watermark. The result of the SPOMF operation is an N×N pattern of correlation values exhibiting one or more peaks if a watermark has been embedded.

The T correlators 231, 232, . . . operate in the one-dimensional time domain. The output of each correlator is a series of N correlation values which is stored in a corresponding one of T buffers 241, 242, . . . . A peak detector 25 searches the highest correlation value in the T buffers, and applies said peak value to a threshold circuit 26. If the peak value of at least one of the buffers is larger than a given threshold value, it is decided that the watermark is present. Otherwise the content will be classified as not watermarked. A suitable threshold value has been found to be 5 standard deviations, which corresponds to a false alarm probability of $1.43 \cdot 10^{-6}$.

A payload can be encoded in the signal by embedding shifted versions of the watermark w(n) in a manner similar to that disclosed in International Patent Application WO-A-99/45705, already cited in the opening paragraph. It should further be noted that, although T parallel correlators are shown in FIG. 2, it may be advantageous to carry out the respective operations in a time-sequential manner.

A video watermarking scheme is disclosed, which is designed for the digital cinema format, as it will be used on large projector screens in theaters. The watermark is designed in such a way that it has minimal impact on the video quality, but is still detectable after capture with a handheld camera and conversion to, for instance, VHS, CD-Video or DVD format. The proposed watermarking system only exploits the temporal axis. This makes it invulnerable to geometrical distortions generally caused by such a way of capturing. The watermark is embedded by modulating a global property of the frames (e.g. the mean luminance) in accordance with the samples of the watermark. The embedding depth is preferably locally adapted within each frame to local statistics of the respective image. Watermark detection is performed by correlating the watermark sequence with extracted mean luminance values of a sequence of frames.

The invention clamed is:

1. A method of detecting a watermark in a motion image signal comprising a corresponding sequence of images, the method comprising:
   providing a reference watermark, via a watermark detector, as a sequence of reference watermark samples, each watermark sample forming a portion of the watermark but not the entire watermark;
   forming a corresponding sequence of mean luminances by determining, for each image of the corresponding sequence of images, a mean luminance of the pixels constituting each image;
   correlating the sequence of reference watermark samples with the corresponding sequence of the mean luminances;
   testing a correlation value generated from the correlating to determine whether the correlation value exceeds a predetermined threshold; and generating an output signal, in correspondence with the testing when the correlation value exceeds a predetermined threshold, indicating that the watermark is detected.

2. An apparatus for detecting a watermark in a motion image signal, the apparatus comprising:
- means for providing a reference watermark as a sequence of reference watermark samples, each watermark sample forming a portion of the watermark but not the entire watemark;
- means for forming a corresponding sequence of mean luminances by determining, for each image of a corresponding sequence of images, a mean luminance of the pixels constituting each image;
- means for correlating the sequence of reference watermark samples with the corresponding sequence of the mean luminances;
- means for testing a correlation value generated by the means for correlating to determine whether the correlation value exceeds a predetermined threshold; and
- means for generating an output signal, in correspondence with the testing when the correlation value exceeds a predetermined threshold, indicating that the watermark is detected.

* * * * *